G. W. BELFORD.
Trucks.

No. 147,889. Patented Feb. 24, 1874.

Witnesses
James Thurlow
John Brown

George W. Belford
by E. Thurlow
his atty.

UNITED STATES PATENT OFFICE.

GEORGE W. BELFORD, OF BRIMFIELD, ILLINOIS.

IMPROVEMENT IN TRUCKS.

Specification forming part of Letters Patent No. 147,889, dated February 24, 1874; application filed June 11, 1873.

*To all whom it may concern:*

Be it known that I, GEORGE W. BELFORD, of Brimfield, in the county of Peoria and in the State of Illinois, have invented a Truck or Carriage Attachment to Corn-Shellers for Conveyance; and do hereby declare that the following is a full, clear, and exact description thereof, reference being had to the annexed drawings making a part of this specification, in which like letters of reference refer to like parts, and in which—

Figure 1:
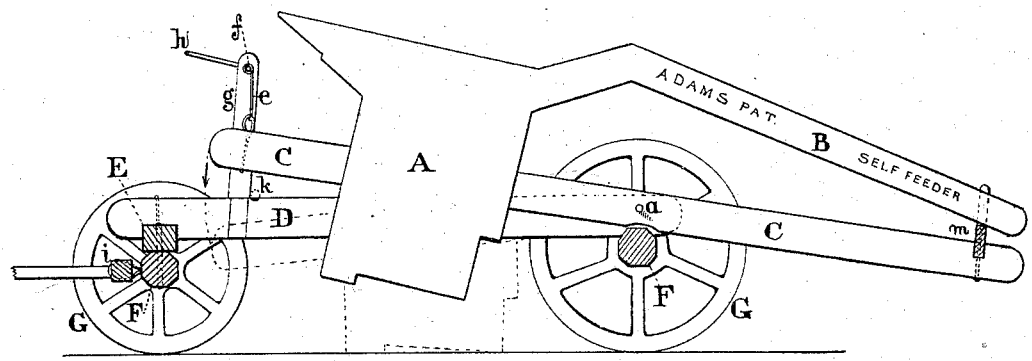
Figure 2:
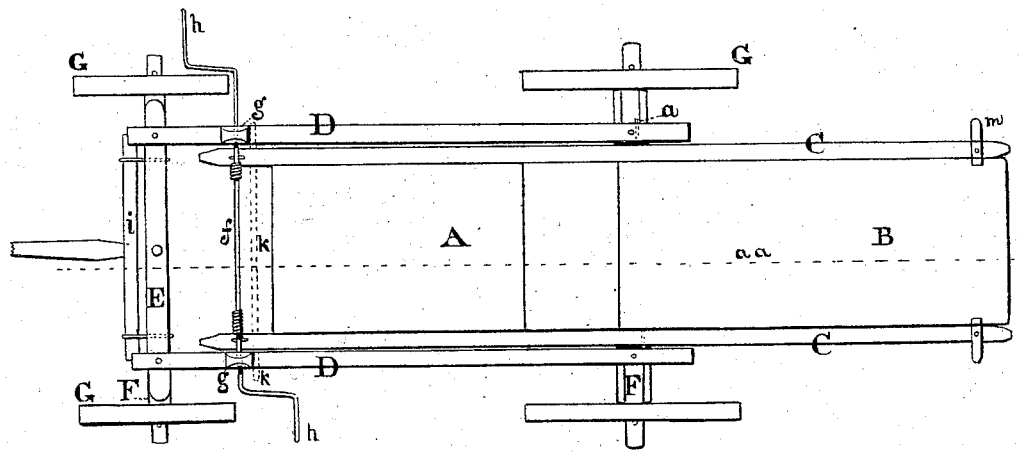

Figure 1 represents a sectional elevation through the center, longitudinally, (on dotted line *a a*, Fig. 2;) Fig. 2, a plan.

This invention is for the transportation of large or heavy corn-shellers from farm to farm, or elsewhere, and also to serve as a mounting and base to steady the machine while being worked by the horse-power, or other running-power; and consists in mounting the sheller between two stout beams, C C, which extend on either side of the machine from the head of the feeders at one end, to the rear of the machine on the other. Near the center these beams are pivoted upon a horizontal bar, *a*, which is secured transversely across the end of a truck E D D F G G, &c. The beams C C are raised at one end to lift the machine from the ground, when in transit, by a winch, and the machine is prevented from descending to the ground by passing a bar across the truck, beneath the supporting-beams C C.

In the drawings, A represents the corn-sheller with its feeder B, the end of the latter being supported by a bar, *m*, at the rear end of the beams C C. C C are two stout parallel beams, which extend the whole length of the machine A, and its feeding-troughs B, and are strongly attached to the body of the machine, being horizontal when the machine A rests upon the ground (between the truck-frame D D) in working position. These beams C C are pivoted near their centers upon a transverse bar, *a*, or similar pivot, between the sides of the truck-frame D D near the axle F. Said bar passes through the side pieces of the truck-frame. The forward ends of the beams C C terminate a little to the rear of the forward axle F of the truck, and are suspended (when the machine is in transit) by means of a rope or chain, *e*, passing around a roller or bar, *f*, terminating in a winch, *h h*, supported upon two standards, *g g*, erected upon the truck-frame D D. Close to the base of these standards *g g*, a bar, *k*, is laid or inserted across the truck, beneath the beams C C, to carry the ends of the latter. D D E, the frame of the truck, which is attached to and carries the beams C C C and sheller A within it. The frame rests at one end, (where the bar *a* passes through them) upon the axle F, supported on the wheels G, and upon an axle, F, and wheels G G, pivoted to the bar E, for facility in turning the truck.

The operation of this invention is as follows: The machine A, or sheller, is inclosed between the beams C C, which are fastened firmly thereto. The latter being pivoted to the cross-bar *a*, uniting the ends of the frame D D, are readily raised at the parts to which the sheller is attached by means of the chain *e*, roller *f*, and winch *h*, the machine (sheller) being thus raised from the ground after operating it. The bar *k* is then inserted across the truck-frame next to the standards *g g*, and the sheller and beams are lowered so that the latter rest upon the same, and the sheller is ready to be hauled away. On the contrary, when the machine is to be used for shelling corn, it is lowered to the ground by means of the winch, after removing the bar *k*. The sheller now rests upon the ground ready for operation, the wheels and truck-frame giving it a broad firm base, and requires now little pegging or staking during the operation of the motive power which works it.

This truck is peculiarly adapted to the "Adams" and "Alton" corn-shellers, or six feeding-hole machines, which, without such a truck and levers, C C, as described, require at least six men to elevate it to the vehicle which is to transport it, not to mention the trouble and inconvenience of detaching the feeding-trough and gearing before handling and lifting the machine.

What I claim as my invention is—

The truck-frame composed of the bar E, beams D D, hoisting-standards $g$ $g$, roller $f$, winch $h$ $h$, bar $k$, pivoted bars C C, with the bar or pivot $a$, all combined and applied to the wheels and axles, and adapted for the supporting and transporting, of a corn-sheller, substantially as set forth.

In testimony that I claim the foregoing corn-sheller carriage, I have hereunto set my hand this 24th day of May, 1873.

GEORGE W. BELFORD.

Witnesses:
JOHN V. WILLIAMS,
HENRY W. WELLS,